(12) United States Patent
Graham et al.

(10) Patent No.: US 7,217,382 B2
(45) Date of Patent: May 15, 2007

(54) SHEETER GAP ADJUSTMENT AND HYDRAULIC OPERATION

(75) Inventors: Lawrence Alan Graham, Corinth, TX (US); Andrew Cecil Harvey, Waltham, MA (US); Ponnattu Kurian Joseph, Irving, TX (US); Edward Leon Ouellette, Denton, TX (US)

(73) Assignee: Frito-Lay North America, Inc., Plano, TX (US)

( * ) Notice: Subject to any disclaimer, the term of this patent is extended or adjusted under 35 U.S.C. 154(b) by 294 days.

(21) Appl. No.: 10/919,132

(22) Filed: Aug. 16, 2004

(65) Prior Publication Data

US 2006/0033237 A1    Feb. 16, 2006

(51) Int. Cl.
*A21C 3/02* (2006.01)
(52) U.S. Cl. ............... 264/280; 425/367; 426/502
(58) Field of Classification Search ............. 425/367; 100/168; 264/280; 426/502
See application file for complete search history.

(56) References Cited

U.S. PATENT DOCUMENTS

| | | | |
|---|---|---|---|
| 3,684,332 A | * | 8/1972 | Benson et al. ............ 384/256 |
| 4,102,171 A | | 7/1978 | Petry et al. |
| 4,154,078 A | | 5/1979 | Lehmann |
| 4,260,578 A | * | 4/1981 | Moody ............... 264/40.7 |
| 4,328,744 A | | 5/1982 | Pav et al. |
| 4,555,103 A | | 11/1985 | Larson |
| 5,048,411 A | * | 9/1991 | Siebert ................ 100/331 |
| 5,571,549 A | * | 11/1996 | Ouellette et al. ......... 426/231 |
| 5,720,913 A | | 2/1998 | Andersen et al. |
| 5,743,483 A | | 4/1998 | Scherer et al. |
| 5,813,959 A | | 9/1998 | Hader et al. |

FOREIGN PATENT DOCUMENTS

| | | | |
|---|---|---|---|
| JP | 07265042 A | * | 10/1995 |
| NL | 9402026 A | * | 7/1996 |

* cited by examiner

*Primary Examiner*—Robert B. Davis
(74) *Attorney, Agent, or Firm*—Carstens & Cahoon, LLP; Colin P. Cahoon; William S. Wang

(57) ABSTRACT

An improved dough sheeting system and method which allow for improved selection of sheeter gap size and which provide a quick release mechanism to prevent damage to sheeter rollers. Hydraulic actuators, attached to a movable roller, hold the roller in a fixed position relative to an opposing roller. The actuators are engaged with a closing force in excess of the force exerted by the sheeted material against the rollers thereby ensuring that the rollers maintain a gap of fixed width. Thermal expansion blocks mounted to the frame or housing of the opposing roller provide a means for fine adjustments in the sheeter gap.

15 Claims, 3 Drawing Sheets

SHEETER GAP ADJUSTMENT AND HYDRAULIC OPERATION

BACKGROUND

1. Technical Field

The present invention relates to an improved apparatus to form a uniform continuous thin sheet of product. More specifically, this invention relates to the use of hydraulic actuators to rigidly fix the position of a movable roller relative to an opposing roller. The invention also relates to the use of thermal expansion blocks to make minute adjustments to the position of the opposing roller thereby precisely adjusting the sheeter gap.

2. Description of Related Art

In a conventional dough sheeter, opposing rollers are separated by a small gap or nip. Dough or other product material is fed into the nip above the rollers and passes through the rollers to form a sheet. In one configuration, one roller is generally fixed in a frame while an opposing roller is adjustable so that a product thickness can be selected.

One adjusting mechanism to manipulate the position of a roller consists of some form of a screw jack driven by a manual crank or electric motor. Alternatively, the adjusting mechanism may consist of other known leveraging mechanisms to implement large-scale and small-scale changes to the size of a sheeter nip. Tapered blocks may be used to fix the position of one roller relative to the other. Another commonly used mechanism to adjust nip size consists of a moveable roller attached to a pivoting frame.

A drawback of these and similar designs is that sometimes the combined deflection of the frame, adjusting mechanism, rollers, and bearings exceeds the desired gap setting for high loads and thin products. For example, in potato chip manufacturing, typical sheeter rollers can experience as much as a 0.030 inch (0.762 mm) deflection during operation which can hinder precise sheet thickness control.

Extraordinary care is usually required to assure that the rollers do not collide when there is no product in the nip of a sheeter. A sudden loss of dough feed could result in the relief of the elastic strain in the rollers, frame, and adjusting mechanism, resulting in the rollers coming into contact with each other, and being damaged thereby. Damage could also result to rollers with relatively large diameters upon a temperature change; excessive thermal expansion of mechanical parts could cause damage. For example, if the temperature of the rollers is controlled to a temperature below ambient conditions, the loss of coolant could result in both rollers naturally coming to room temperature, and for large diameter rollers, the resulting diameter change in the rollers could exceed the gap between them.

One remedy for the possible large mechanical deflection is to clamp the rollers together, and set the gap between the rollers at assembly. In such case, the amount of mechanical strain under a load could be minimized by the elimination of machine elements such as are found in the aforementioned adjusting mechanisms. One drawback to this approach is that gap changes may be made only by changing shims in the machine, a task that would require taking the machine out of production for some period of time. For large diameter rollers, especially those that are temperature controlled, this method does not protect against roller contact resulting from thermal expansion of the rollers beyond the available gap between the rollers. Therefore, damage may still be caused from large temperature changes and thermal expansion of sheeting machinery.

Consequently, a need exists for a system and a method for providing safe and effective operation of a dough sheeter having a mechanism for quickly increasing the sheeter gap in order to prevent damage to the rollers. Additionally, a need exists for a system and method to allow for improved accuracy in the adjustment of the sheeter gap, especially while sheeter rollers are in production under a load. Such a system should provide these features and should be capable of high-speed, high-capacity production. Additionally, the resulting system should be mechanically stiff so as to minimize deflections under an operating load. Such a system should provide improved precision in order to produce a thin uniform sheet of product.

SUMMARY OF THE INVENTION

An improved dough sheeting system and method are disclosed which allow for improved selection of the size of a sheeter gap or nip, and which provide a quick release mechanism to prevent damage to sheeter rollers. Particularly, the invention includes hydraulic actuators attached to a roller which hold the roller in a fixed position relative to an opposing roller. The actuators are engaged with a closing force in excess of the force exerted by the sheeted material against the rollers thereby ensuring that the rollers maintain a gap of fixed size. Thermal expansion blocks, upon which the frame of an opposing roller is mounted, provide a means for fine adjustments in sheeter gap size. Additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

Throughout the drawings, where the same part appears in more than one drawing, the same number is applied thereto.

Figure 2:
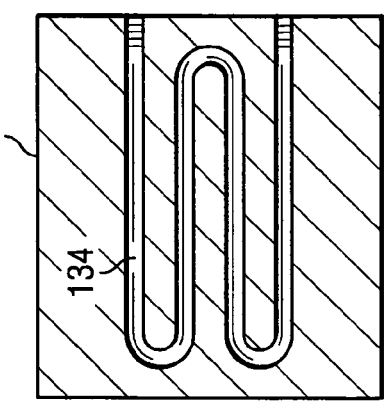
FIG. 2 is a cross-sectional drawing of a thermal expansion block in accordance with the present invention showing internal fluid passages.

REFERENCE NUMERALS 102 mounting block
104 thermal expansion block
106 bearing housing
108 product material
110 feeding conveyor
112 opposing fixed roller
114 adjustable roller
116 sheeted product
118 exiting conveyor
120 connecting member
122 mechanical stop 124 hydraulic member
126 hydraulic actuator
128 shims
130 fixed stop
132 sheeter gap
134 internal fluid passages
136 moveable section
138 fixed section
140 external frame
302 left side of fixed roller
304 right side of fixed roller

DETAILED DESCRIPTION

While the invention is described below with respect to a preferred embodiment, other embodiments are possible. The concepts disclosed herein apply equally to systems for producing sheeted products.

The primary objective of this invention is to provide an apparatus and method which may be used to quickly make adjustments to produce a sheeted product of a desired uniform thickness. The sheeter gap, and hence the thickness of such product, can be precisely controlled by the combination of two mechanisms. The first mechanism is a hydraulic actuator which keeps an adjustable roller fixed in place relative to an opposing roller with less inherent mechanical deflection. The second mechanism is one or more thermal expansion blocks. An opposing roller is mounted to such thermal blocks, and the position of the opposing roller may be finely adjusted by changes in the temperature of such blocks.

Under a load of about 2,500 pounds per linear inch (44,650 kilograms per linear meter), as measured along the width of sheeter rollers, a sheeting apparatus with an operating nip size between 0.009 and 0.012 inches (0.23 to 0.24 mm) produces a finished product that is about 0.026 inches (0.65 mm) in thickness. Ordinarily, under such loading, the deflection of the rollers is about 0.030 inches (0.760 mm). In one embodiment of the invention, the deflection is reduced from 0.030 inches (0.760 mm) to about 0.010 inches (0.254 mm) under such a load. According to the embodiment, the equipment is stiffer, thus the amount of deflection is reduced. The stiffer the equipment, and subsequently lower deflection, the less effect variations in dough rheology have on the sheeter nip size and consequently the sheeted product thickness. The largest source of mechanical deflection in a dough sheeting apparatus is found in the interplay between the parts comprising the sheeter nip adjustment mechanism. Some deflection is inherent because of the arrangement of mechanical connections between such parts as the frame, roller housing, roller bearings, and rollers. However, even the reduced deflection is on the same order of magnitude as a typical operating sheeter nip size.

Figure 1:
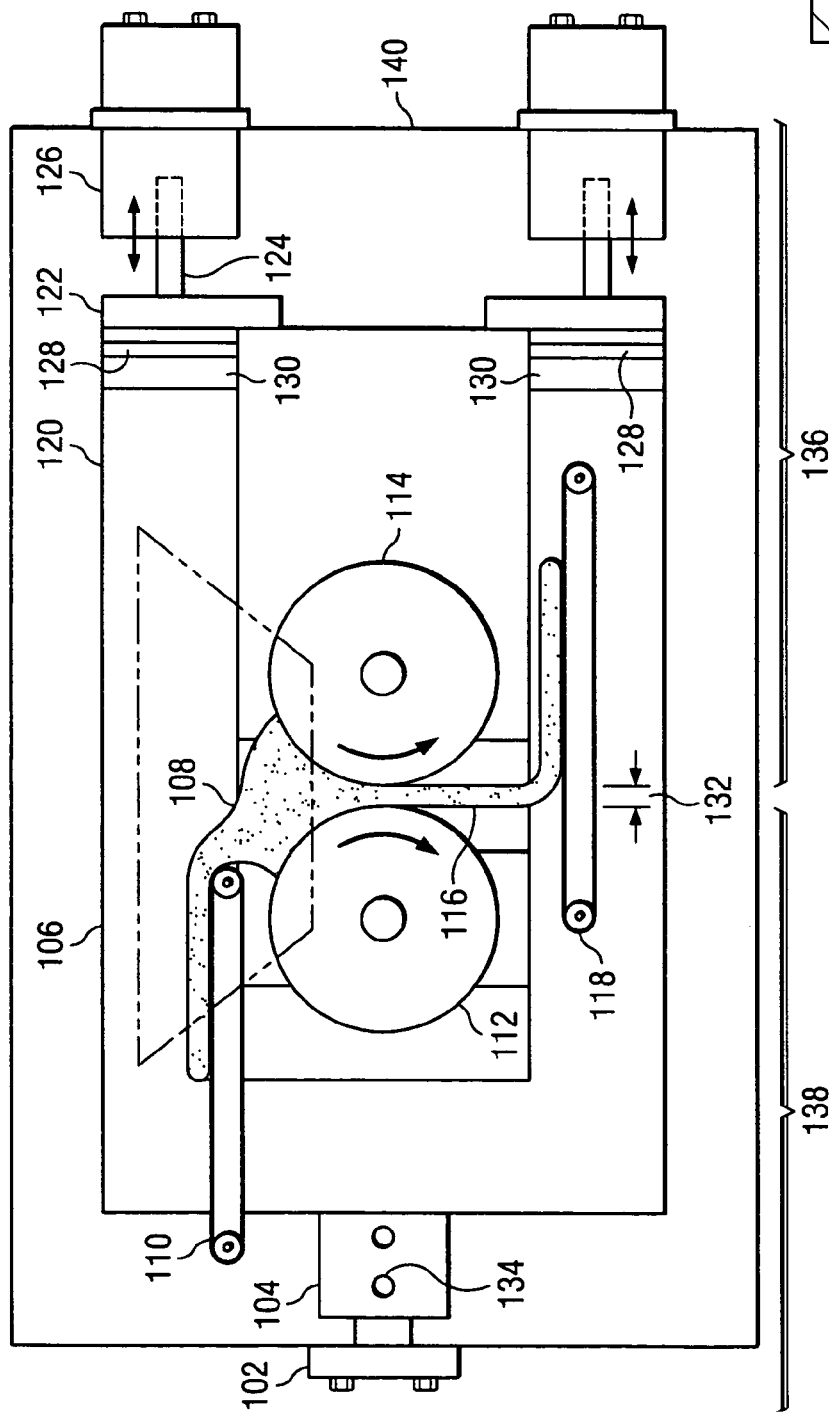
FIG. 1 is a cross-sectional side drawing of one embodiment of the present invention showing the fixed and moveable roller sections.

With reference to FIG. 1, an opposing fixed roller 112 is attached by its bearing housings 106 to one or more thermal expansion blocks 104, which in turn are connected to mounting blocks 102 attached to an external frame 140. The thermal blocks can alternatively be attached to the machine frame without intermediate mounting blocks or other similar connectors. The opposing roller 112 is part of a fixed section 138 wherein miniscule physical deflections are minimized as much as possible under operating conditions.

An adjustable roller 114 is attached by its bearing housing 106 to a connecting member 120. The connecting member 120 is attached to a mechanical stop 122 and a hydraulic member 124. Each hydraulic member 124 is engaged by a hydraulic actuator 126. Such actuator 126 applies a closing force to the hydraulic member 124 such that the closing force is sufficient to keep the entire moveable section 136 fixed in an engaged position by pressing an attached mechanical stop 122 against a fixed stop 130. A closing force is typically in the range of one-and-a-half to two times the opposing force exerted on the rollers by product material 108 being sheeted.

Shims 128 may be inserted between the mechanical stop 122 and the fixed stop 130 in order to perform a coarse adjustment to the sheeter gap 132. Shims 128 may be placed in other physical locations which ultimately determine the engaged position and the size of the sheeter gap 132. In a preferred embodiment, the shims 128 are easily accessed and may be readily changed in a relatively short amount of time thereby facilitating the rapid adjustment of the size of the sheeter gap 132. In another embodiment, a mechanical stop 122 may be adjusted and locked into various positions relative to an opposing fixed roller 112.

Product material 108 is fed to the top of the rollers 112, 114 by a feeding conveyor 110. The product material 108 applies a resisting force against each roller. Such force is less than the force exerted by the hydraulic actuators 126. Thus, the position of the moveable section 136 remains fixed. The sheeted product 116 leaves the rollers by way of an exiting conveyor 118.

In the operation of one embodiment, at startup, the sheeter gap 132 is 0.40 to 0.50 inches (10.2 to 13 mm) in size as product material 108 is initially fed to the apparatus. This large gap is achieved by actuating one or more hydraulic actuators 126 to an open position. This operating position protects the rollers from colliding due to the lack of dough feed or thermal expansion of the rollers. Next, the hydraulic actuators 126 are actuated to a closed position, thus the sheeter gap 132 is reduced to a preferred operating size of about 0.010 inches (0.254 mm). At the end of operation, the sheeter gap 132 is again returned to a relatively large value by again actuating the hydraulic actuators 126 to an open position before the flow of product material 108 ceases. In this way, the risk of having the sheeter rollers 112, 114 inadvertently contact and having them damage each other is reduced.

During operation, fine adjustments to the size of the sheeter gap 132 may be made by cooling or heating the thermal expansion blocks 104. In a preferred embodiment, the blocks 104 are made of stainless steel for providing rapid and effective expansion or contraction. However, other metals, metal alloys, or other materials can be used to obtain a desired thermal expansion in order to achieve a desired range of movement.

In one embodiment, with an operating sheeter gap 132 of about 0.010 inches (0.254 mm), an opposing fixed roller 112 can be moved over a range of at least 0.004 inches (0.10 mm) by cooling or heating of at least one attached thermal block 104. In another embodiment, the range of thermal expansion is 0.007 inches (0.178 mm). Other operating sizes of sheeter gap are possible, and other ranges of thermal expansion are possible.

Increasing the temperature of a thermal block 104 causes expansion of the same, resulting in a decrease in the sheeter gap. Similarly, cooling causes contraction of the thermal block 104, resulting in an increase in the sheeter gap 132. Physical expansion of the thermal block material is a function of temperature, and such expansion is linearly proportional to changes in temperature. As a thermal block 104 is expanded or contracted, the position of an opposing fixed roller 112 is changed relative to the other roller 114.

With reference to FIG. 1 and FIG. 2, in one embodiment, even though an opposing roller 112 is attached to a fixed section 138 of a sheeting apparatus, the position of the opposing roller 112 relative to an adjustable roller 114 can be manipulated by changing the temperature of at least one thermal block 104. The sheeter gap 132 can thus be adjusted even while the adjustable roller 114 is fixed in place by a hydraulic force. In one embodiment, a thermal block 104 contains at least one internal fluid passage 134, which facilitates the uniform cooling and/or heating of said thermal block 104 by passing a fluid of a different temperature through the fluid passage 134. A fluid may be composed of one or more compounds known in the industry used for such heat exchanging purposes including, but not limited to, water, oil, glycol, and ethanol. The fluid may also be a gas. Heating or cooling of a thermal block 104 may be accomplished by other means including electric heaters, contact with a refrigeration element, or passing a fluid around the exterior of the block. A thermal block 104 may also be composed of several elements or mechanical pieces that in combination expand or contract to perform an expanding or contracting function. Other similar embodiments are possible.

Figure 3:
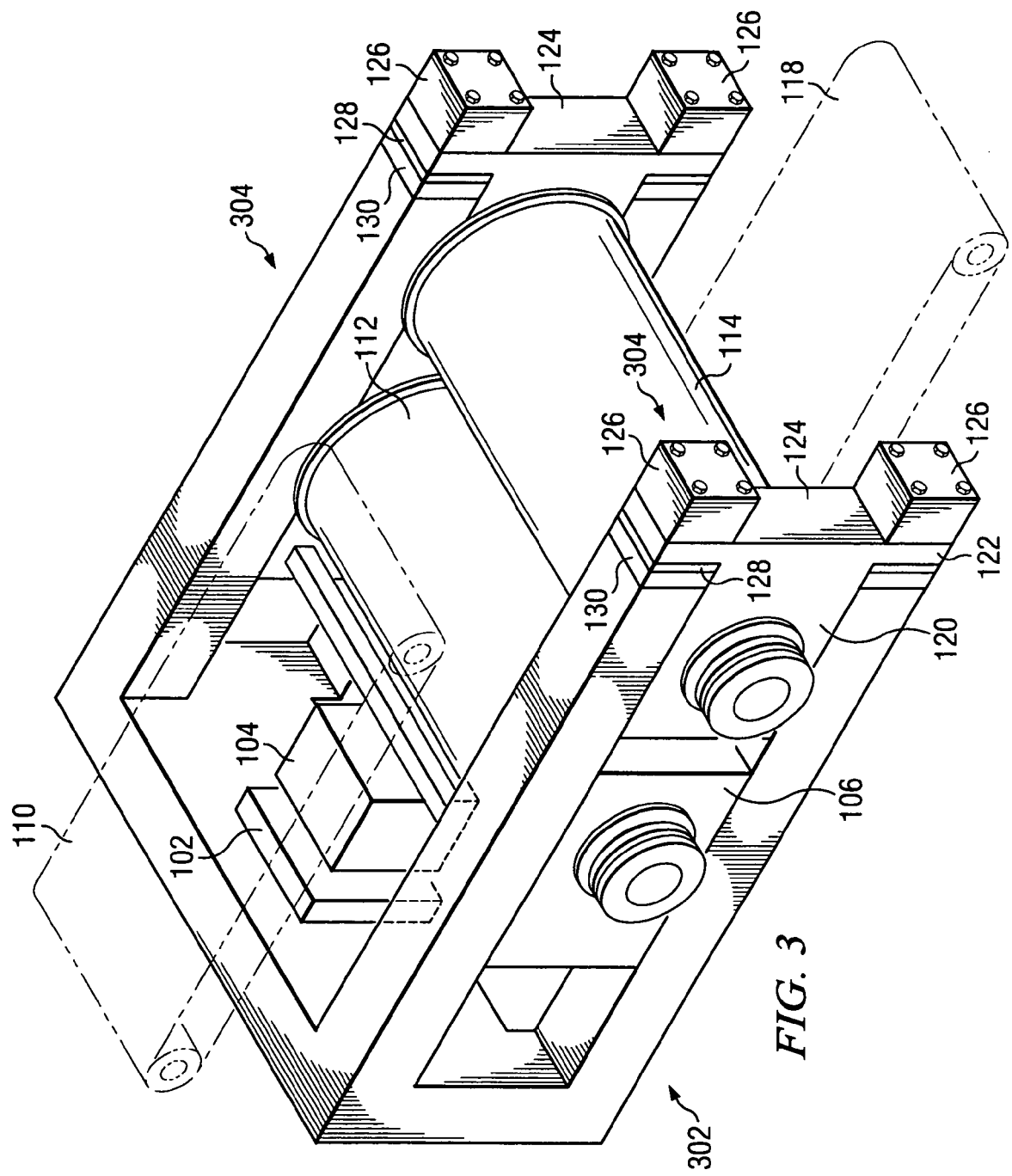
FIG. 3 is a perspective view of one embodiment of the present invention showing an external housing and means of rotating sheeting rollers; and, FIG. 4 is an overhead cross-sectional drawing showing a rear fixed roller and a front hydraulic, clamped roller.
Figure 4:
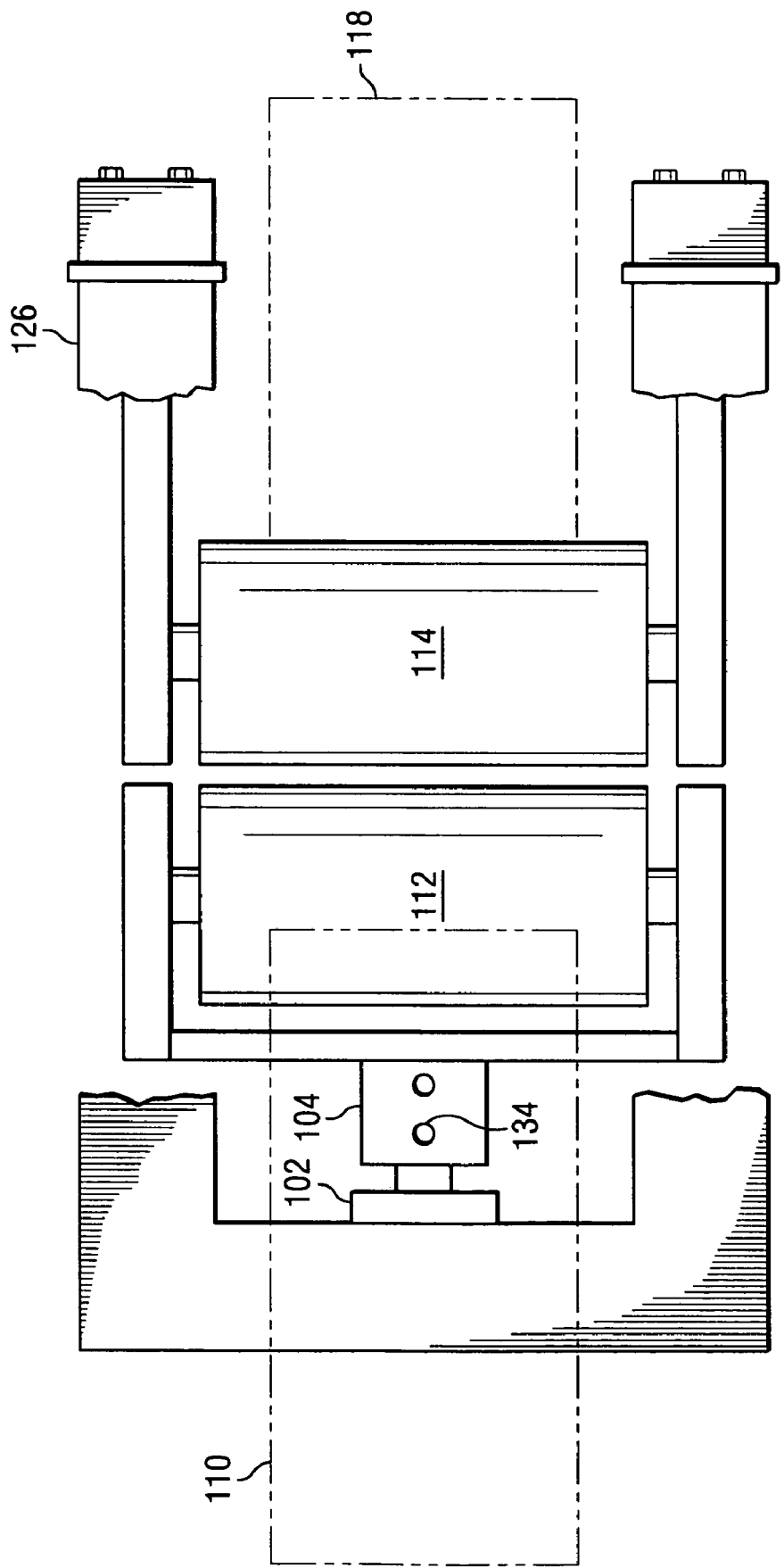

With reference to FIGS. 3 and 4, temperature adjustment to one or more thermal expansion blocks 104 may be made independently on a left side 302 and a right side 304 of a fixed roller 112. Such independent adjustment allows fine tuning to the corresponding sheeter gap 132 and resulting sheeted product 116. In one embodiment, such independent adjustment ensures uniform thickness of a sheeted product 116 across the width of a sheeter gap 132. Such independent adjustment compensates for differing amounts of deflection in left and right sides. In another embodiment, it is desirable to have a sheeted product 116 of non-uniform thickness across the width of a sheeter gap 132, different thicknesses on right and left sides.

With reference to FIG. 1, the hydraulic actuators 126 may be rapidly actuated thereby releasing the force pressing the adjustable roller 114 into position against a fixed stop 130 in response to a change in one or more process conditions. According to the present invention, if there is a sudden loss of product material 108 between the rollers 112, 114, the quick release mechanism prevents the adjustable roller 114 from forcefully contacting the fixed roller 112. The release mechanism also applies to a loss of thermal control of one or more thermal blocks 104, loss of roller cooling, or loss of communication with the process equipment, during operation.

One embodiment uses water in the internal fluid passages 134 of the thermal blocks 104 to control thermal block temperature. The sheeter gap 132 is adjusted over a size range by controlling the amount of thermal expansion of the thermal block 104. The amount of thermal expansion is controlled by using a water temperature between an ambient water supply temperature (about 75 degrees F. in the summer) and 180 degrees F., a range sufficiently below the boiling point of water so as to not produce steam. In one embodiment, cooling of the thermal block 104 is accomplished by ambient air cooling. In another embodiment, cooling is accomplished with water cooled by a separate refrigeration device to approximately 35 degrees F., thereby increasing the sheeter gap adjustment range, and allowing for more rapid changes from one temperature set point to another. In still another embodiment, alternate heat transfer fluids such as oil, glycol, or others could be used in conjunction with external heating and cooling systems to provide for a temperature range greater than that range between water's freezing and boiling points.

One aspect of the present embodiment is that the hydraulically actuated roller position can be easily adjusted using shims, which reduces the need for a large adjustment range for thermal blocks, and thus permits the use of simple and low cost ancillary heating equipment. One shim arrangement provides for a sheeter gap range suitable for a single product. An alternate shim size can then be used for an alternate product of a different thickness.

Returning to FIG. 3, which is a perspective view of the apparatus shown in FIG. 4, a means of rotating the sheeting rollers—typically gears attached to axle ends—are positioned and accessible on the outside of their housings 106, 120. For example, the supporting/driving axles for the fixed 112 roller and the adjustable roller 114 pass through the housings 106, 120 and are collared by gears, wheels, or flanges outside of the housings 106, 120. In the embodiment shown in FIG. 3, the rollers 112, 114 and roller housings 106, 120 are moveable within an external frame. If desired, however, the housings 106, 120 alternatively can be designed to have adequate space through which the adjustable roller's 114 axle can move when the hydraulic actuators engage and disengage.

While the invention has been particularly shown and described with reference to a preferred embodiment, it will be understood by those skilled in the art that various changes in form and detail may be made therein without departing from the spirit and scope of the invention.

We claim:

1. A sheeting apparatus comprising:
   a) a fixed sheeting roller;
   b) an adjustable sheeting roller located substantially parallel and approximate to said fixed sheeting roller creating a sheeting nip;
   c) a mechanical stop and a first shim adjacent to said mechanical stop which establishes an engaged position of said adjustable sheeting roller relative to said fixed sheeting roller, wherein said mechanical stop is capable of being fixed in more than one position relative to said fixed sheeting roller of a) by replacing said first shim having a first thickness with a second shim having a second thickness which is different from said first thickness of said first shim; and,
   d) an hydraulic actuator which provides a closing force sufficient to maintain said adjustable sheeting roller fixed in place against said first shim or said second shim of c) during operation of said sheeting apparatus.

2. The apparatus of claim 1 wherein said fixed sheeting roller of a) is attached to at least one thermal expansion block such that said fixed sheeting roller is located between said at least one thermal expansion block and said adjustable sheeting roller.

3. The apparatus of claim 2 further comprising a fluid for said thermal expansion block.

4. The apparatus of claim 2 wherein said thermal expansion block provides for a continuous and controllable change in size of said nip over a range of at least 0.002 inches (0.051 mm) by moving said fixed sheeter roller of a) relative to said adjustable sheeter roller of b).

5. A sheeting apparatus comprising:
   a) a fixed sheeting roller;
   b) an adjustable sheeting roller located substantially parallel and approximate to said fixed sheeting roller creating a sheeting nip;

c) a mechanical stop which establishes an engaged position of said adjustable sheeting roller relative to said fixed sheeting roller;

d) an hydraulic actuator which provides a closing force sufficient to maintain said adjustable sheeting roller fixed in place against said mechanical stop of c) during operation of said sheeting apparatus; and e) an hydraulic releasing element which is capable of quickly removing said closing force from said hydraulic actuator of d) to prevent said fixed sheeting roller of a) and said adjustable sheeting roller of b) from contacting each other.

6. The apparatus of claim 1 further comprising at least one hydraulic actuator of d) attached to a left side of said adjustable sheeter roller of b), and at least one hydraulic actuator of d) attached to a right side of said adjustable sheeter roller of b).

7. The apparatus of claim 1 wherein said hydraulic actuator of d) is attached to a bearing housing of said adjustable sheeter roller of b).

8. A method for sheeting a product comprising the steps of:
   a) providing a fixed sheeting roller;
   b) providing a releasable sheeting roller located substantially parallel and approximate to said fixed sheeting roller;
   c) providing a mechanical stop and a first shim adjacent to said mechanical stop which establishes an engaged position of said adjustable sheeting roller relative to said fixed sheeting roller, wherein said mechanical stop is capable of being fixed in more than one position relative to said fixed sheeting roller of step a) by replacing said first shim having a first thickness with a second shim having a second thickness which is different from said first thickness of said first shim; and,
   d) providing a closing force to said adjustable sheeting roller sufficient to maintain said adjustable sheeting roller of b) fixed in place against said first shim or said second shim of c) during sheeting of said product.

9. The method of claim 8 wherein said fixed sheeting roller of step a) is attached to at least one thermal expansion block, such that said fixed sheeting roller is located between said at least one thermal expansion block and said adjustable sheeting roller.

10. The method of claim 9 wherein said thermal expansion block provides for a continuous and controllable change in size of said nip over a range of at least 0.002 inches (0.051 mm) by moving said fixed sheeter roller of step a) relative to said adjustable sheeter roller of step b).

11. The method of claim 8 wherein further said closing force of step d) is provided by a hydraulic actuator.

12. The method of claim 11 further comprising at least one hydraulic actuator attached to a left side of said adjustable sheeter roller, and at least one hydraulic actuator attached to a right side of said adjustable sheeter roller.

13. The method of claim 11 wherein said hydraulic actuator is attached to a bearing housing of said adjustable sheeter roller.

14. A method for sheeting a product comprising the steps of:
   a) providing a fixed sheeting roller;
   b) providing a releasable sheeting roller located substantially parallel and approximate to said fixed sheeting roller;
   c) providing a mechanical stop which establishes an engaged position of said adjustable sheeting roller relative to said fixed sheeting roller;
   d) providing a closing force to said adjustable sheeting roller sufficient to maintain said adjustable sheeting roller of b) fixed in place against said mechanical stop of c) during sheeting of said product, wherein said closing force is provided by a hydraulic actuator;
   e) providing an hydraulic releasing element which removes said closing force maintained by said hydraulic actuator of step d) before said fixed sheeting roller of step a) and said adjustable sheeting roller of step b) contact each other.

15. The method of claim 14 wherein further that said hydraulic releasing element removes said closing force in response to a change in at least one process condition.

* * * * *